Figure 1:
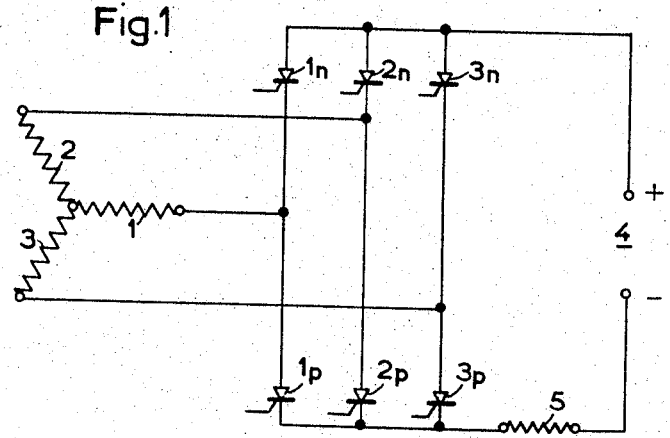

INVENTOR
J. A. Augier
By Hiscock, Vethwill &
Brisebois—Attorneys

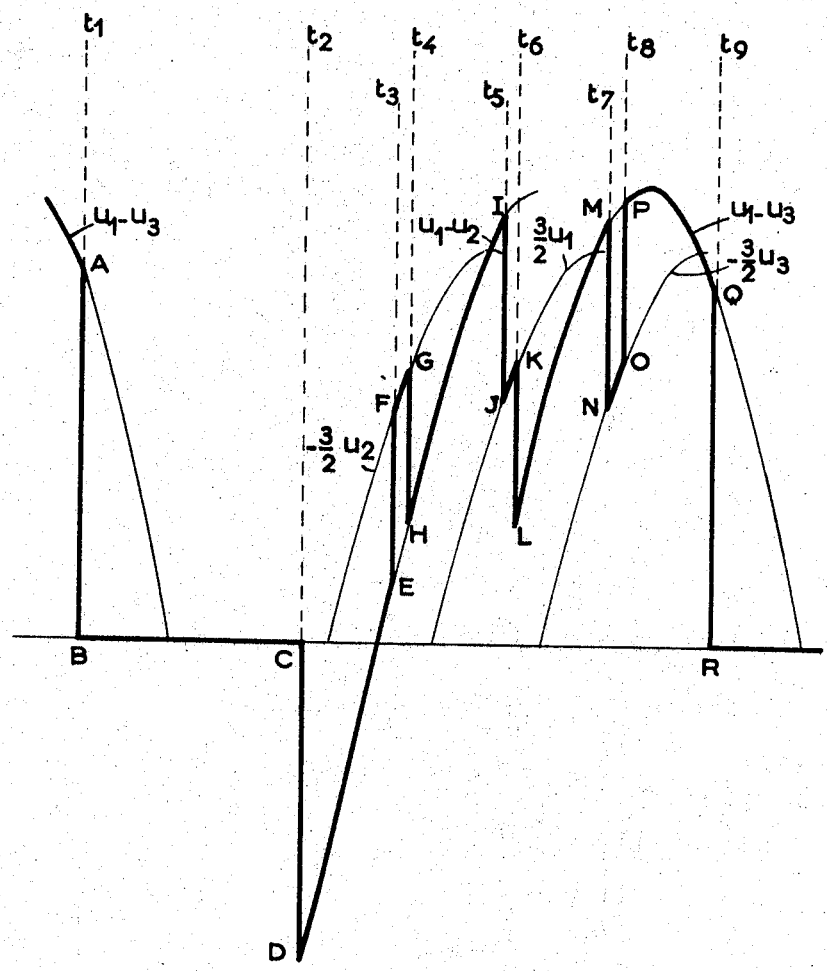

INVENTOR
J. A. Augier
By Holcombe Wetherill &
Brumbaugh - Attorneys

United States Patent Office 3,321,695
Patented May 23, 1967

3,321,695
RECTIFIER INVERTER CIRCUITS WITH CONTROLLED RECTIFIERS AND SATURABLE INDUCTANCE MEANS
Jean Auguste Augier, Belfort, France, assignor to Societe Generale de Constructions Electriques & Mecaniques (Alsthom), a French body corporate
Filed July 10, 1963, Ser. No. 293,938
3 Claims. (Cl. 321—25)

The present invention relates to circuit arrangements of the type which may operate either as inverters or rectifiers, incorporating controlled rectifier elements, such as semi-conductor controlled rectifiers. Such rectifier/inverter circuits may be employed to interconnect polyphase and direct current networks or devices which may function either as loads or sources of energy. When the circuit operates as a rectifier, the polyphase network functions as the source and the direct current network functions as the load, and the circuit serves to rectify the output from the polyphase source and feed it to the direct current load. When the circuit operates in its inverter mode, the direct current network functions as the source and the polyphase network functions as the load, and the circuit converts the output from the direct current source into alternating current and feeds it into the polyphase load.

More particularly, the invention relates to rectifier/inverter circuits of which the operation may be reduced to that of two or more polyphase arrangements employing rectifier elements which are phase-displaced from one another and are connected either in series or in parallel. In the class of such arrangements are conventional arrangements such as, "double three-phase arrangements with interphase transformers," the connection in series of two single path polyphase rectifiers fed by voltages in phase opposition, and more particularly double path or Graetz arrangements, the operation of which is identical with that of the aforementioned arrangement.

It has not hitherto been possible to make such arrangements operate as inverters with satisfactory regularity and reliability.

As is known in the art, in a Graetz bridge arrangement, the abrupt variations in voltage which occur at the beginning and at the end of commutation or switching of each of the rectifier elements have immediate repercussions on the second rectifier element forming part of the same bridge arm. During operation as an inverter, the said abrupt variations in voltage are transmitted to rectifier elements at moments when their anodes or equivalent electrodes are more positive than their cathodes or equivalent electrodes and the elements are still cut off by their control elements.

The same phenomenon generally occurs, but less distinctly, in "double three-phase arrangements with interphase transformers" or "two polyphase arrangements connected in phase opposition and in series."

In fact in such arrangements the voltages in phase opposition are generally supplied by two secondary windings arranged on a common transformer core and the said two windings are generally interwound and closely coupled so that the transformer leakages are, in effect, equivalent to an inductance arranged in series with the primary winding. Under these conditions, the abrupt variations in voltage which occur in each phase at the beginning and at the end of the commutation or switching to an adjacent phase have integral or virtually integral repercussions on the voltage of the phase in opposition.

Even if the secondary winding in phase opposition are not very closely coupled, and only a part of the transformer leakages can be considered as an inductance in series with the primary winding, part of the voltage surges due to the commutation of one phase will still be transmitted to the phase in opposition, whereas during operation as an inverter, the anode of the rectifier element it feeds is more positive than the cathode of the said element and must necessarily be cut off by its control device.

In a controlled semiconductor rectifier constituted by a PNPN three-junction device, the median junction, in a reverse direction, has a fairly large capacitance. When the said rectifier is cut off and undergoes a variation in voltage such that its anode potential rises sharply with respect to its cathode, a considerable capacitive current passes through its median junction. This current necessarily passes through the two end junctions in their forward direction. Such rectifier elements are known to be rendered conductive by the actual passage, in the forward direction of a weak control current passing through one of the end junctions. The voltage surges corresponding to commutation may thus give rise to incorrect control of the rectifier elements, resulting in faulty operation of the circuit as an inverter.

The object of the present invention is to provide a circuit arrangement which overcomes this disadvantage.

Accordingly, the present invention consists in a rectifier/inverter circuit arrangement using controlled rectifier elements, particularly in arrangements of which the operation may be reduced to that of two or more polyphase arrangements which are phase displaced one from another, and are connected either in series, or in parallel, and more particularly to double way arrangements, wherein the rectifier elements, the outputs of which correspond respectively to the ampere-turns in opposite senses in the source of alternating current, are decoupled from one another, either directly, by means of saturable inductances comprising two windings connected between the rectifier elements, or indirectly by means of windings arranged on separate saturable inductances comprising secondary windings connected to one another, in the case both of direct and of indirect coupling, the direction of the coupling being such that an increase in the normal unidirectional current passing through one of the said windings induces in the other winding a voltage tending to cause a current to circulate therein in a direction opposite to that of its normal current, and the value for zero current of the mutual direct or indirect inductance between windings being preferably equal or approximately equal to the internal inductance of the corresponding phase of the alternating voltage source in the case of double way Graetz bridge arrangements, and to the mutual inductance between the internal inductance of two phases in opposition in the case of single way arrangements connected in series or in parallel, but which may depart from these values, and, in particular, be much greater. The said inductances may, if desired, comprise, in addition to their main windings, auxiliary windings through which a direct pre-magnetisation current passes to correct to some extent the phenomena of hysteresis, but are preferably so formed that their magnetic characteristic has only very little or no hysteresis.

The invention will be readily understood from the explanations given below and from the description of embodiments described by way of non-limiting examples in the accompanying drawings.

FIGURE 1 of the accompanying drawings shows an inverter comprising a Graetz bridge double path 3-phase arrangement as it would be made without application of the present invention.

Figure 3:
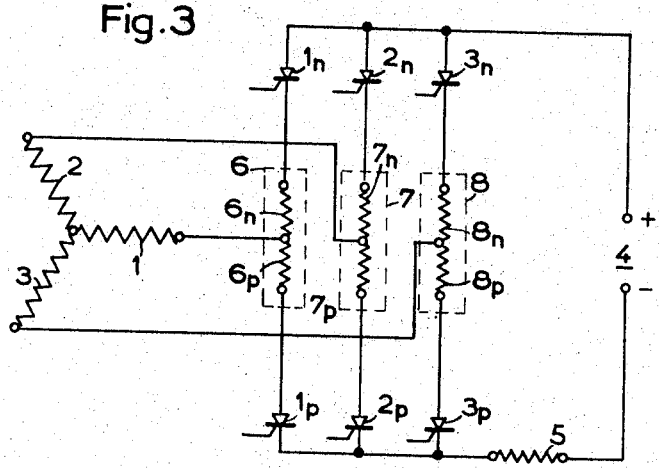

In FIGURE 1, 1, 2 and 3 stand for the three phases of a source of 3-phase current respectively, for example, the star-connected secondary winding, of a 3-phase transformer of which the primary is not shown, but would be connected to a supply network. $1_p$, $2_p$, $3_p$, $1_n$, $2_n$ and $3_n$ stand for six controlled semiconductor rectifier elements respectively: for example, PNPN three-junction devices. The control arrangements and their supply sources are not shown but are well known in the art and may take any of the long-established configurations.

The end of the phase 1 is connected to the cathode of $1_n$ and to the anode of $1_p$. Similarly the ends of the phases 2 and 3 are connected to the cathodes of $2_n$ and $3_n$ and to the anodes of $2_p$ and $3_p$ respectively. The cathodes of $1_p$, $2_p$ and $3_p$ are connected together and to the negative terminal of a direct current circuit which, with the bridge operating as an inverter, comprises a direct current source 4. The anodes of $1_n$, $2_n$ and $3_n$ are connected together and to the positive terminal of the source 4. An inductance 5 may be inserted in the direct current circuit.

The source 4 comprises a device or network (not shown) which sometimes operates as a load, and receives electrical energy from the polyphase source, and sometimes, on the contrary, supplies and returns energy to the polyphase source which then functions as a load. As the invention is particularly concerned with the second operation, it is solely this operation which will be considered in the following description.

The control arrangements of the rectifiers $1_n$ to $3_p$ receive, in symmetrical control, orders to operate as an inverter the orders being such that the said rectifiers are not rendered conductive and can only take the output with an electrical delay angle greater than 90° and sufficiently less than 180°. Under these conditions, energy is supplied by the direct current source 4 and is transferred to the alternating current source.

FIGURE 2 shows the theoretical diagram of the voltage between the anode and cathode of the rectifier $1_p$ (for example), assuming that the direct current circuit inductance is sufficiently great for the ripple of the direct current to be negligible. The delay angle is assumed to be of the order of 135 electrical degrees and the angle of overlap an angle of 15 degrees.

Up to the time $t_1$, which is 135 electrical degrees later than the moment of taking natural output, the rectifier $1_p$ is cut off by its control and takes the output, the voltage between the anode and the cathode following the sinusoidal portion of the compound voltage $u_1-u_3$ between the phases 1 and 3 in FIGURE 1, and being positive.

At the time $t_1$, rectifier $1_p$ is rendered conductive and this voltage abruptly drops along the vertical line AB and is reduced to a value corresponding to the internal voltage drop of the rectifier $1_p$, which is assumed to be negligible in the diagram in FIGURE 2. The voltage remains at this negligible level, represented by the horizontal line BC until time $t_2$. Shortly before the time $t_2$ the rectifier $2_p$ is cut off by its control and begins to take the output. At the time $t_2$, the commutation or switching of the output between rectifiers $1_p$ and $2_p$ is terminated and current ceases to pass through $1_p$. The voltage between the anode and the cathode of $1_p$ becomes negative and abruptly drops along the vertical line CD, rejoins the sinusoidal curve of compound voltage $u_1-u_2$ and follows the portion DE of the curve between phases 1 and 2. The current delivered by the source 4 then passes through the rectifier $3_n$, the phases 3 and 1 and the rectifier $1_p$.

At the time $t_3$, 180 electrical degrees after the time $t_1$, the rectifier $1_n$ is rendered conductive by its control and begins to commutate with the rectifier $3_n$ which is passing the current. Throughout the duration of this commutation, the ends of the phases 1 and 3 are short-circuited through the rectifiers $1_n$ and $3_n$, both of which are conductive. The common potential with respect to the neutral point of the ends of the phases 1 and 3, which is also that of the anode of the rectifier $1_p$, is equal to the vectorial mean of the two corresponding phase voltages, i.e. to a potential in phase opposition and equal to half the potential of the end of the phase 2. Since the rectifier $2_p$ is passing current at this moment the common potential of the cathodes of $1_p$ and $2_p$ is that of the end of the phase 2. Hence, throughout the duration of the said connection between $3_n$ and $1_n$, the anode-cathode voltage of $1_p$ is in phase opposition with the voltage of the phase 2 and is equal to one and a half times that voltage. In the diagram in FIGURE 2 it follows the portion FG of the sinusoidal curve—$\frac{3}{2}u_2$. At the time $t_4$, the commutation between $3_n$ and $1_n$ is terminated and the voltage once again follows the portion H1 of the sinusoidal curve $u_1-u_2$. At the beginning and at the end of this commutation, the voltage makes two vertical surges EF and GH.

At the time $t_5$, 240 degrees later than $t_1$, the rectifier $3_p$ is rendered conductive and commutates with $2_p$. The common potential with respect to the neutral point of the cathodes of the rectifiers $1_p$, $2_p$ and $3_p$ is then in phase opposition with the voltage of the phase 1 and is equal to half of it. The anode-cathode voltage follows the portion JK of the sinusoidal curve $\frac{3}{2}u_1$ up to the time $t_6$, when it drops to the sinusoidal curve of compound voltage $u_1-u_3$, and follows the portion LM of the latter up to the time $t_7$, 300 electrical degrees later than $t_1$, when the rectifier $2_n$, which is rendered conductive, begins to take the charge and to commutate with $1_n$. The common potential with respect to the neutral point of the ends of the phases 1 and 2, and hence of the anode $1_p$ is in phase opposition and equal to half the voltage of the phase 3 whereas the potential (still with respect to the neutral point) of the three cathodes of $1_p$, $2_p$ and $3_p$ is the same as that of the end of the phase 3. The anode-cathode voltage then follows the portion NO of the sinusoidal curve—$\frac{3}{2}u_3$, only to rise again at $t_8$, which corresponds to the end of the commuation, and follows the portion PQ of the sinusoidal curve $u_1-u_3$. At $t_9$, one full period in advance of $t_1$, $1_p$ is again rendered conductive and the cycle which has just been described recommences.

It will be seen that during the time interval during which the rectifier $1_p$ must remain cut off without being able to take the output, although its anode is more positive than its cathode, the voltage between its anode and its cathode rises sharply twice, as shown by the vertical lines EF and OP of the times $t_3$ and $t_8$, both surges resulting from the commutations of the rectifier $1_n$, connected in the same arm of the bridge. These abrupt surges in voltage of the anode with respect to the cathode are dangerous, by reason of the fairly large capacitance constituted by the median NP junction of the PNPN three-junction device. This capacitance current is in the anode-cathode direction; it passes through the two end junctions in their forward direction, and, as we know, the control signal which cuts off or triggers the three-junction device and renders it conductive, actually consists of the injection of a weak current in the forward direction through one of the end junctions. These positive surges in voltage are therefore likely to give rise to false commands causing the rectifiers to take the output at moments of the period when they should remain blocked, or else they will upset the operation of the inverter.

It is thus a more precise object of the invention sufficiently to attenuate the undesirable surges in the voltage between anode and cathode and thereby to eliminate the causes of false commands and the resulting faulty operation.

FIGURE 3 shows one embodiment of the invention as applied to the Graetz bridge shown in FIGURE 1. In FIGURE 3 the ends of the phases 1, 2 and 3 respectively are connected to the anode and to the cathode of the rectifiers $1_p$ and $1_n$, $2_p$ and $2_n$, $3_p$ and $3_n$ respectively, via the windings $6_p$ and $6_n$, $7_p$ and $7_n$, $8_p$ and $8_n$ respectively of compensating saturable inductors 6, 7 and 8. The directions of the windings of these compensating inductors are such that the fluxes corresponding to the normal currents passing through the windings, $6_n$ and $6_p$, for example, are in the same direction, which corresponds to the required coupling direction. The cathodes of the rectifier elements $1_p$, $2_p$ and $3_p$ are connected together and to the negative terminal of the direct current source 4 whereas the anodes of the elements $1_n$, $2_n$ and $3_n$ are connected together and to the positive terminal of the source 4. An inductance 5 may be inserted in the direct current circuit. The control arrangements of the rectifier elements $1_n$ to $3_p$ receive orders to operate as an inverter in a conventional symmetrical command.

One anode-cathode voltage will now be considered, by way of example, namely that of the rectifier $1_p$. Between the times $t_2$ and $t_3$ (v. FIGURE 2), when a direct current of negligible ripple passes through the rectifiers $3_n$ and $2_p$ and the windings $8_n$ and $7_p$, virtually no voltage is induced in the windings of the inductors 7 and 8. The value of the anode-cathode voltage is not modified by these inductors. The commutation between the rectifiers $3_n$ and $1_n$ commences at the time $t_3$. At a moment $t$ during this commutation the rate of variation $di/dt$ of the current which is set up in the rectifier $l_n$, the winding $6_n$ and the phase 1 creates a voltage drop $$l\frac{di}{dt}$$

in the phase 1, where $l$ stands for the value of the internal inductance of this phase. The said rate of variation $di/dt$ also induces a voltage drop in the winding $6_n$, and, by reason of the coupling, a voltage $$m\frac{di}{dt}$$

in the same direction in the winding $6_p$, where $m$ stands for the value of the mutual inductance between the windings $6_n$ and $6_p$. The voltage between the anode of rectifier $1_p$ and the neutral point of the alternating current source undergoes a voltage drop $$l\frac{di}{dt}$$

on which a rise in voltage $$m\frac{di}{dt}$$

is superimposed by virtue of the direction of the coupling between the windings $6_n$ and $6_p$. If the two values $l$ and $m$ are equal and remain constant, the voltage between the anode of the rectifier $1_p$ and the neutral point is in no way modified by the commutation between the rectifiers $1_n$ and $3_n$. If $m$ is smaller than $l$, whilst both are constant, the peak EFGH and the trough MNOP are reduced in amplitude in the ratio $$\frac{1-m}{l}$$

However, the mutual inductance $m$ is not constant, but dependent, for each current value, upon the derivative $d\Phi/di$ of the flux passing through one of the windings with respect to the current circulating in the other winding.

Figure 4:
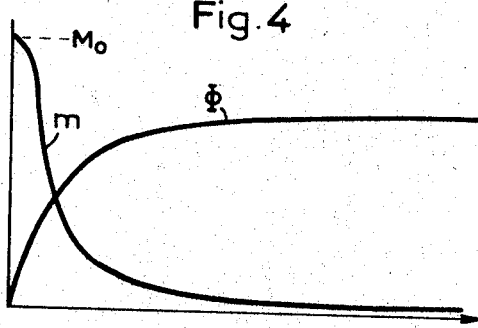

In FIGURE 4, the curve $\Phi$ represents the flux passing through the winding $6_p$ (for example) as a function of the current $i$ passing through the winding $6_n$ of the inductors 6. The inductors 7 and 8 are assumed to have identical flux characteristics. The curve $m$ represents the mutual inductance between the two windings $6_p$ and $6_m$ as a function of the current $i$.

It is assumed that the maximum value $M_0$ of the mutual inductance is equal to the value $l$ of the internal inductance per phase of the supply source.

Figure 5:
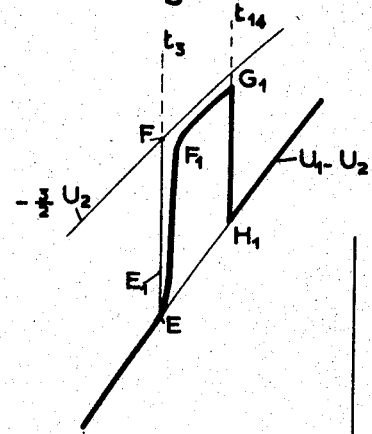

FIGURE 5 diagrammatically illustrates the voltage between the anode and the cathode of the rectifier element $1_p$ during the commutation between rectifier elements $1_n$ and $3_n$. The beginning of this commutation is assumed to occur at the same time $t_3$ referred to during the explanations given in connection with FIGURE 2. At the said start of the commutation, the current in the winding $6_n$ is zero and the value of the mutual inductance $m$ is at its maximum $M_0$, assumed to be equal to $l$. The voltage surge EF in FIGURE 2 (also shown in FIGURE 5 by the same references EF) is fully compensated and the anode-cathode voltage of the rectifier $1_p$ is momentarily kept on the sinusoidal curve of compound voltage $u_1-u_2$. Since the current builds up progressively in the winding $6_n$, the inductor 6 begins to be saturated and the value $m$ of the mutual inductance decreases, as shown in FIGURE 4. The ratio $$\frac{1-m}{l}$$

increases and the correction of the peak becomes less and less. The value of the anode and cathode voltage of the rectifier $1_p$ progressively rises along the curve $EF_1G_1$. It progressively approaches, but does not reach, the sinusoidal curve—$\frac{2}{3}u_2$, by reason of the residual of mutual inductance which persists even when the inductor 6 is strongly saturated. The commutation ends at the time $t_{14}$, slightly later than the time $t_4$ in FIGURE 2 and the explanations given with reference to FIGURES 2 and 3 explain how the anode-cathode voltage of the rectifier $1_p$ abruptly drops back along $G_1H_1$ on to the sinusoidal curve $u_1-u_2$.

Figure 6:
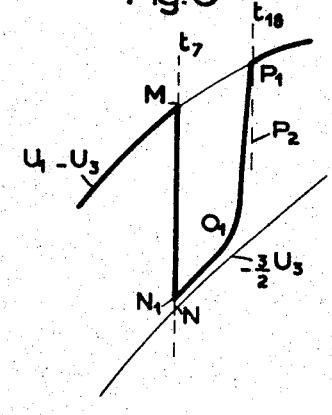

FIGURE 6 refers to the commutation between the rectifier elements $1_n$ and $2_n$. It will be assumed that this commutation begins at the same time $t_7$ as in the case of FIGURE 2. At the beginning of this commutation, the full operating current of the inverter is flowing through the rectifier $1_n$ and the winding $6_n$. The inductor 6 is saturated and the coefficient of mutual inductance $m$ is small with respect to $l$ as shown in FIGURE 4. The compensation is very low and the anode-cathode voltage which formerly followed the sinusoidal curve of compound voltage $u_1-u_3$ falls abruptly along the line $MN_1$ towards the point N on the sinusoidal curve—$\frac{2}{3}u_3$. During the commutation, the current passing through the winding $6_n$ is progressively reduced. When the inductor 6 begins to be desaturated, the value of the coefficient of mutual inductance $m$ increases to reach the value $M_0=l$ at the end of the commutation, at the time $t_{18}$, slightly later than the time $t_8$ in FIGURE 2, for an infinitely small current, and the ratio $$\frac{1-m}{l}$$

therefore tends towards zero. The compensation improves and is practically perfect at the end of the commutation. The anode-cathode voltage moves along the curve $N_1O_1P_1$ which brings it progressively back to the sinusoidal curve $u_1-u_3$.

Comparison of FIGURES 5 and 6 with the corresponding parts of FIGURE 2 shows that the application of the invention allows the voltage peak and trough corresponding to the commutation of the rectifier element such as $1_n$ located in the same bridge arm to remain in the anode-cathode voltage of a rectifier element such as $1_p$, but with a slightly modified shape. If the abrupt drops in voltage GH and MN in FIGURE 2 are slightly modified, being replaced by the drops $G_1H_1$ in FIGURE 5 and $MN_1$ in FIGURE 6 which are as abrupt but of a slightly reduced amplitude, the abrupt rises in voltage EF and OP in FIGURE 2 are replaced by the progressive rises in voltage $EF_1$ and $O_1P_1$ in FIGURES 5 and 6 which occur with much more moderate increase rates $du/dt$. It is the abrupt increases in the anode-cathode voltage which are dangerous and which can result in unwanted control effects on the rectifier element subjected to them by reasons of the resultant capacitative current in the median NP junction of the PNPN three-junction device. The fact that the increases in voltage $EF_1$ and $O_1P_1$ occur progressively with the moderated increase rates $du/dt$ reduces the said capacitative current to a value which is not dangerous and which is not likely to give rise to undesirable controls.

It will easily be seen that if the initial value $M_0$ of the coefficient of mutual inductance is less than $l$, the phenomena corresponding to FIGURE 5 will be modified in the following way: From the start of the commutation, the compensation is not perfect. The anode-cathode voltage will jump abruptly from the point E to the point $E_1$, the length $EE_1$ being equal to the length EF multiplied by $$\frac{1-M_0}{l}$$

Figure 7:
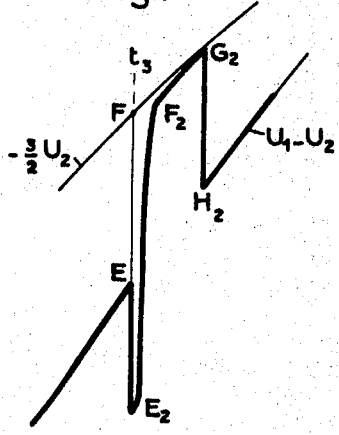

The anode-cathode voltage will then rise progressively along a path similar to that of the rise $EF_1G_1$, after which it will abruptly drop again at the end of the commutation. The phenomena corresponding to FIGURE 6 will not be modified at the beginning of the commutation. The anode-cathode voltage will abruptly drop at $N_1$, but the rise in voltage at the end of the commutation can no longer occur along the curve $O_1P_1$ since the compensation will be insufficient for zero voltage. There will be a progressive rise in voltage up to $P_2$ $$\left(\text{with } P_1P_2 = P_1O_2 \times \frac{1-M_0}{l}\right)$$

along a curve similar to $O_1P_1$, then an abrupt rise along $P_2P_1$. The operation of the inverter will still be ensured under good conditions if the amplitudes of the positive voltage jumps $EE_1$ and $P_2P_1$ are not excessive. However, the initial value $M_0$ may conveniently be distinctly greater than that of $l$, and the anode-cathode voltage of the rectifier $1_p$ in such a case, is diagrammatically shown in FIGURE 7, during commutation between $1_n$ and $3_n$. In this case, the expression $$\frac{1-M_0}{l}$$

is negative, and the voltage induced in the winding $6_p$ is higher than the drop in voltage in the inductance $l$. This results in over-compensation, the first effect which appears at the beginning of the commutation, at the time $t_3$, and is evidenced by an abrupt drop $EE_2$ in the anode-cathode voltage of the rectifier $1_p$. As a result, as the current rises and the inductor 6 is saturated, there is a progressive rise in voltage $E_2F_2G_2$, similar in shape to the rise $EF_1G_1$ in FIGURE 5. As in the case illustrated by FIGURE 5, the end of the commutation causes an abrupt drop in the anode-cathode voltage of the rectifier 1.

Figure 8:
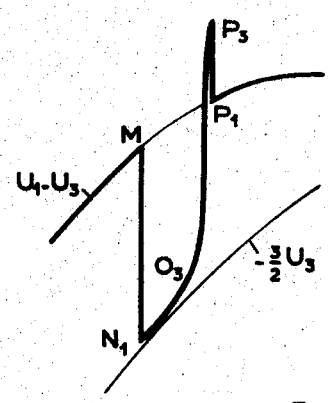

FIGURE 8 corresponds to commutation between the rectifiers $2_n$ and $1_n$, assuming the coefficient $M_0$ to be greater than the coefficient $l$. As in the case illustrated by FIGURE 6, the inductor 6 is saturated at the beginning of the commutation and the same abrupt drop $MN_1$ of the anode-cathode voltage of the rectifier $p_1$ is observed. As the inductance is desaturated, the anode-cathode voltage follows the curve $N_1O_3P_3$. Towards the end of the commutation, when the current in the winding $6_n$ has become sufficiently low, the coefficient $m$ becomes greater than the coefficient $l$, the effect is reversed, and the curve representing the anode-cathode voltage passes along the sinusoidal curve $u_1-u_3$. At the end of the commutation, the effect entirely disappears and the anode-cathode voltage abruptly drops back along $P_3P_1$ on to the sinusoidal curve $u_1-u_3$.

It will be seen that the only effect of an initial value of the coefficient $M_0$ greater than that of the coefficient $l$ is to cause fresh abrupt drops in the anode-cathode voltage which do not have any disadvantage.

Figure 9:
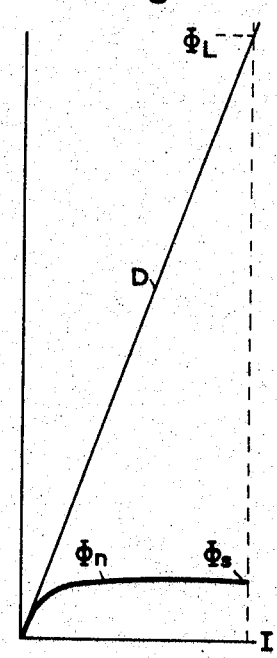

FIGURE 9, which is on a different scale to FIGURE 4, shows how the drop in supplementary inductive voltage due to the compensating or decoupling inductors is considerably reduced if the said decoupling inductors are saturable. In this Figure, the curve $\Phi_n$ represents the flux flowing through one of the windings, the winding $6_n$, for example, of one of the inductors 6, 7 or 8, as a function of the current passing through it. If the coupling between the two windings $6_n$ and $6_p$ is very tight, for example, if the said two windings are closely interwound, the curve $\Phi_n$ in FIGURE 9 would be very close to the curve $\Phi$ in FIGURE 4 (if FIGURES 4 and 9 were drawn to the same scale) and, for the same current value, the ordinates of the curve $\Phi_n$ would exceed those of the curve $\Phi$ only by a few percent. The initial value of the inductance of the winding $6_n$, i.e. the derivative $$\frac{d\Phi n}{di}$$

for $i=0$, then exceeds the initial value $M_0$ of the mutual inductance between the windings $6_n$ and $6_p$ only by a few percent; the said mutual inductance has already been said to be equal to the internal inductance per phase $l$ of the supply source. If the decoupling inductors are not saturable, the mutual inductance between two of their windings must have the same value $M_0$ if it is desired to ensure the same compensation for the abrupt voltage jumps. If the windings of the non-saturable inductor are also closely interwound, the inherent inductance of the winding also exceeds the value $M_0$ only by a few percent and is substantially equal to the value of the initial inductor of the winding $6_n$ of the inductor 6 in FIGURE 3. Under these conditions, the flux flowing through the winding of the non-saturable inductor is, in effect, represented as a function of the current flowing through the winding by the line D in FIGURE 9 namely, a tangent to the origin of the curve $\Phi_n$. During the commutation e.g. between the rectifier elements $3_n$ and $1_n$, in the case of the arrangement shown in FIGURE 3, the flux in the winding $6_n$ passes from zero to the value $\Phi_s$ corresponding to the current I supplied by the rectifier or received by the inverter. In the case of a non-saturable linear inductor arrangement, the flux in the winding rises from zero to the value $\Phi_L$ corresponding to the same current I. It is known that the drop in inductive voltage of a rectifier or inverter arrangement is proportional to the variation in flux which occurs during a commutation in the inductor or inductors inserted in the circuit of one of the commuting rectifier elements. Where linear inductors are used, the supplementary inductive drop due to the coupling inductors is proportional to the value $\Phi_L$ whereas in the case of saturable decoupling inductors such as the inductances 6, 7 and 8 in FIGURE 3 the supplementary inductive drop is proportional to the value $\Phi_s$ and is very considerably less.

The curves in FIGURE 4 and those in FIGURES 5, 6, 7 and 8 correspond to magnetic characteristics of the decoupling inductors 6, 7 and 8 possessing no or negligible, free from hysteresis, and, as has been shown above, such characteristics are considered to be preferable. Such characteristics may easily be achieved in practice by making the magnetic cores of the decoupling inductors of a material having a low coercive force, and by providing small air-gaps. However, it may be that decoupling inductors possessing considerable hysteresis, too great to be ignored have to be used. In this event, the arrangement of FIGURE 3 would still be usable, but the decoupling inductors would not be used to advantage. Since the fluxes in these inductors are unidirectional, only the variation in flux between the value corresponding to saturation and that corresponding to residual magnetism would be used. It is therefore preferable in this case to provide the decoupling inductors with an auxiliary pre-magnetising winding which slightly displaces the magnetic characteristics.

Figure 10:
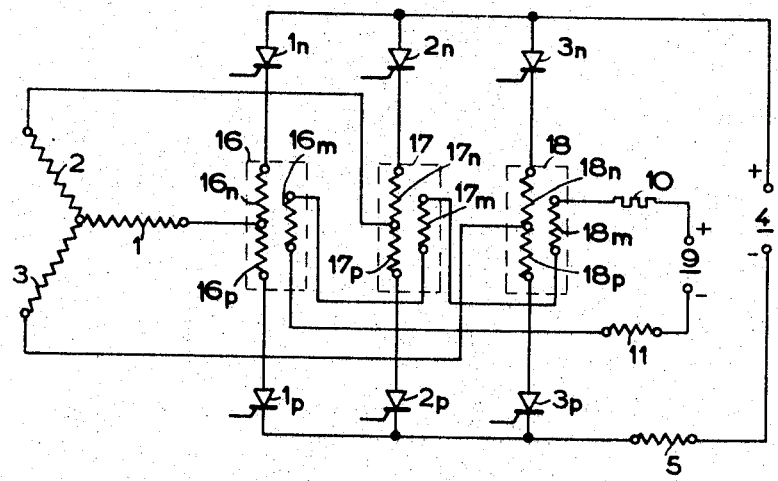

In FIGURE 10, the same 3-phase secondary having the same phases 1, 2 and 3 as in FIGURE 1 feeds a Graetz bridge provided with the same rectifier elements $1_n$ to $3_p$ as in the said figure but the decoupling inductors 6, 7 and 8 are replaced by the inductances 16, 17 and 18, of which the hysteresis phenomenon is too great not to be taken into account. These inductors have windings $16_n$ and $16_p$, $17_n$ and $17_p$, $18_n$ and $18_p$ which serve the same function as the windings $6_n$ and $6_p$, $7_n$ and $7_p$, $8_n$ and $8_p$ in FIGURE 3 and are connected in the same manner. Each of these inductors is also provided with a supplementary premagnetising winding: $16_m$, $17_m$ and $18_m$ respectively. The said supplementary windings are mounted in series and are fed with direct current by an auxiliary source 9, and if desired via a resistor 10 and an inductance 11. The direction of the connections is such that the ampere-turns of the windings $16_m$, $17_m$ and $18_m$ are in opposition to the ampere-turns of the windings $16_n$ and $16_p$, $17_n$ and $17_p$, $18_n$ and $18_p$. As in FIGURE 3, the Graetz bridge operates as an inverter and is fed with direct current by the same source 4. If the said source 4 provides a constant voltage, or a substantially constant voltage, the auxiliary source 9 can be dispensed with and the windings $16_m$, $17_m$ and $18_m$ may be fed by the source 4 itself.

Figure 11:
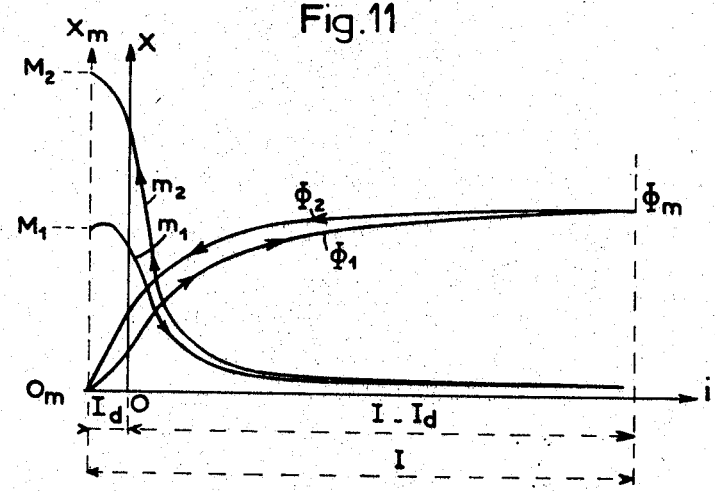

FIGURE 11 shows the magnetic characteristics of one of the inductors, for example, the inductor 16. The two curves $\Phi_1$ and $\Phi_2$ represent the values of the flux flowing through the winding $16_p$ as a function of the current circulating in the winding $16_n$ for an assymetrical cycle in which the flux varies, for example, between a low value, a zero value, and a high value corresponding to the saturation of the magnetic circuit. If the winding $16_n$ is the only one to be fed, then since the windings $16_p$ and $16_m$ are in effect, open circuited, the values of the current in the windings $16_n$ will be measured from the origin O corresponding to the axes of co-ordinates $O_x$ and $O_i$. During the cycle, the said current will vary between a negative value—$I_d$ corresponding to the coercive force and a value $I-I_d$. The curve $\Phi_1$ corresponds to the increasing current and fluxes, and the curve $\Phi_2$ to the decreasing current and fluxes. These two curves $\Phi_1$ and $\Phi_2$ remain valid if a direct current flows through the winding $16_m$, provided that the origin of the currents is suitably displaced. For instance, if the intensity of the premagnetising current in the winding $16_m$ is equal to $I_d$ multiplied by the transformation ratio between the two windings $16_n$ and $16_m$, the origin of the currents must be displaced towards the left by a length corresponding to $I_d$ and the curve $\Phi_1$ and $\Phi_2$ relate to the axes of co-ordinates $O_m$ $i$ and $O_m$ $x_m$. For such a premagnetising current, flux and current are simultaneously nil. It will be assumed in the following description that the premagnetising current is that which exactly compensates the coercive force, but this hypothesis is made only in order to simplify the explanation. The coefficient of mutual inductance between the windings $16_n$ and $16_p$ will, as before, be defined by the derivative $d\Phi/di$ of the flux flowing through one of the windings with respect to the current circulating in the other. But in this case, by reason of the hysteresis phenomenon, two values of the coefficient of mutual inductance, $m_1$ and $m_2$, correspond to each value of the current, the said values relating to curve $\Phi_1$, i.e. to increasing fluxes and currents, and the second to the curve $\Phi_2$, i.e. to the decreasing current and fluxes respectively. These two values, $m_1$ and $m_2$, corresponding to the same current, are of the same order when the magnetic circuit begins to reach the state of saturation, but, at low values of current, they generally differ considerably. In particular, for zero current, the initial value $M_2$ will be much greater than the initial value $M_1$. Hence it is no longer possible, in the case where the hysteresis is too great to be ignored, to determine the values of the decoupling inductors in such a manner that the compensation for the voltage surges is exact, or, approximately exact, at the right moments, i.e. when the current in the windings such as $16_n$ is very close to zero, both when the current is initiated and when it disappears. But, as has been explained with reference to FIGURES 5, 6, 7 and 8, while it is disadvantageous for the initial value $M_0$ of the mutual inductance to be much less than the value of the internal inductance per phase of the supply source, it is in no way disadvantageous for it to be greater. It is therefore be advantageous for the decoupling inductors 16, 17 and 18 to have values such that the initial value $M_1$ of the coefficient of mutual inductance on the initiation of the current approximates to the value $l$ of the internal inductance per phase of the source. Under these conditions, the voltage between the anode and the cathode of the rectifier element $1_p$ will follow the curve shown in FIGURE 5 during the commutation between the rectifier elements $1_n$ and $3_n$, and that shown in FIGURE 8 during the commutation between the rectifier elements $2_n$ and $1_n$.

The explanations which have just been given will serve to show how the invention would be applied to other cases. For instance, in the case of a double 3-phase arrangement, the saturable inductors would be provided with two windings inserted in the circuits in phase opposition of each the 3-phase secondaries respectively. Similarly, in the case of indirect coupling, the saturable inductors would be coupled in pairs by secondary windings.

I claim:

1. A rectifier/inverter circuit arrangement comprising a source of polyphase alternating current and a direct current arrangement capable of functioning both as a direct current load and, a source of direct current, at least two groups of controlled semi-conductor rectifiers connecting said alternating current source with the said direct current source and operable to transfer electrical energy from said direct current source to the polyphase source upon function of said circuit arrangement as an inverter, in which condition said polyphase source serves as a load, coil windings interconnected between said rectifiers and said polyphase source, and saturable magnetic coupling means between each of the said coil windings of one of said groups of rectifiers and the particular coil winding of the other group of rectifiers which corresponds to ampere-turns in the opposite sense in said polyphase source, the direction of said magnetic coupling being such that an increase in the normal direct current passing through the coil winding of one of said groups of rectifiers induces a voltage in the coupled winding of the other group of said rectifiers which tends to cause a current to circulate in it in the opposite direction to that of its normal direct current.

2. A rectifier/inverter circuit arrangement comprising a source of polyphase alternating current and a direct current arrangement capable of functioning both as a direct current load and, a source of direct current, at least two groups of controlled semi-conductor rectifiers arranged in a double path Graetz bridge connecting said polyphase and direct current sources, and operable to transfer electrical energy from said direct current source to the polyphase source upon function of said current arrangement as an inverter, in which condition said polyphase source serves as a load, inductive compensating means comprising coil windings interconnected between said rectifiers and said polyphase source, and saturable magnetic coupling means between each of the said coil windings of one of said groups of rectifiers and the particular coil winding of the other group of rectifiers which corresponds to ampere-turns in the opposite sense in said polyphase source, the direction of the said magnetic coupling being such that an increase in the normal direct current passing through the winding of one of the said groups of rectifiers induces a voltage in the coupled coil winding of the other group of said rectifiers tending to cause a current to circulate therein in the opposite direction to that of its normal direct current, and the mutual inductance of the two coupled coil windings being substantially equal, for zero current, to the internal inductance of the corresponding phases of said polyphase source.

3. An inverter circuit comprising a polyphase alternating current network functioning as a load, a source of direct current, at least two groups of controlled semi-conductor rectifiers connected in a single path arrangement connecting said polyphase and direct current sources, compensating inductors including, coil windings interconnected between said rectifiers and said polyphase source, and saturable magnetic coupling means between each of said coil windings of one of said groups of rectifiers and the particular coil winding of the other group of rectifiers which corresponds to ampere-turns in the opposite sense in said polyphase source, the direction of said magnetic coupling being arranged so that an increase in the normal direct current passing through the coil winding of one of said groups of rectifiers induces a voltage in the coupled coil winding of the other group of said rectifiers which tends to cause a current to circulate in it in the opposite direction to that of its normal direct current, and the mutual inductance of the two coupled coil windings being substantially equal, for zero currents, to the mutual inductance between the internal inductances of the two corresponding phases of said polyphase source.

References Cited by the Examiner

FOREIGN PATENTS 894,563    4/1962    Great Britain.

JOHN F. COUCH, *Primary Examiner.*

G. GOLDBERG, *Assistant Examiner.*